(12) United States Patent
Sugawara et al.

(10) Patent No.: US 9,154,220 B2
(45) Date of Patent: Oct. 6, 2015

(54) LARGE-CAPACITY FIBER OPTICAL SWITCHING DEVICE AND OPTICAL TRANSMISSION SYSTEM

(71) Applicant: Hitachi, Ltd., Tokyo (JP)

(72) Inventors: Toshiki Sugawara, Tokyo (JP); Hidehiro Toyoda, Tokyo (JP); Kenichi Tanaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 65 days.

(21) Appl. No.: 14/185,168

(22) Filed: Feb. 20, 2014

(65) Prior Publication Data
US 2014/0241712 A1    Aug. 28, 2014

(30) Foreign Application Priority Data
Feb. 22, 2013    (JP) ................. 2013-033428

(51) Int. Cl.
| | |
|---|---|
| G02F 1/00 | (2006.01) |
| G02F 2/00 | (2006.01) |
| H01S 3/00 | (2006.01) |
| H04B 10/00 | (2013.01) |
| H04J 14/00 | (2006.01) |
| H04B 10/038 | (2013.01) |
| G02B 6/02 | (2006.01) |
| H04B 10/032 | (2013.01) |
| H04B 10/077 | (2013.01) |
| H04J 14/02 | (2006.01) |
| G02B 6/35 | (2006.01) |

(52) U.S. Cl.
CPC .......... *H04B 10/038* (2013.01); *G02B 6/02042* (2013.01); *G02B 6/3528* (2013.01); *H04B 10/032* (2013.01); *H04B 10/077* (2013.01); *H04J 14/029* (2013.01); *H04J 14/0275* (2013.01); *H04J 14/0291* (2013.01)

(58) Field of Classification Search
CPC ............. G02B 6/02042; G02B 6/3528; H04B 10/032; H04B 10/077; H04B 10/038; H04J 14/0291; H04J 14/0275; H04J 14/029

USPC ............................................................ 398/5
See application file for complete search history.

(56) References Cited

U.S. PATENT DOCUMENTS

| | | | |
|---|---|---|---|
| 7,167,652 B2 | 1/2007 | Tomooka et al. | |
| 2007/0292129 A1* | 12/2007 | Yan et al. ........................ | 398/5 |
| 2011/0274438 A1 | 11/2011 | Fiorentino et al. | |

FOREIGN PATENT DOCUMENTS

| | | |
|---|---|---|
| JP | 11-340922 | 12/1999 |
| JP | 2012-514768 | 6/2012 |

OTHER PUBLICATIONS

B. Lee, et al., "End-to-End Multicore Multimode Fiber Optic Link Operating up to 120 Gb/s", Journal of Lightwave Technology, vol. 30, No. 6, Mar. 15, 2012, pp. 886-892.

*Primary Examiner* — Daniel Dobson
*Assistant Examiner* — Mina Shalaby
(74) *Attorney, Agent, or Firm* — Brundidge & Stanger, P.C.

(57) ABSTRACT

A highly reliable optical switching device and optical switching method ensure restoration of the failure in the large-capacity high density wiring of the multicore fiber with the general number of cores (7 cores, 19 cores and the like). An optical transmission system which transmits a supervisory control signal concerning a transmission path switching to one or more cores of a single or multiple multicore fibers, an active signal to one or more cores, and a standby signal to one or more cores includes optical switching devices connected to respective ends of the optical transmission system. Upon detection of the transmission failure of the active signal based on the signal transmission condition and information from the supervisory control signal, it is switched to the standby signal. The supervisory control signal is transmitted to the center core of the multicore fiber.

15 Claims, 8 Drawing Sheets

FIG. 12

| PATH (CORE FOR TRANSMISSION) | ACTIVE/ STANDBY | PATH PRIORITY | CONDITION | ACTION TAKEN AGAINST FAILURE |
|---|---|---|---|---|
| 120-1 | ACTIVE | TOP PRIORITY | ○ NORMAL | ⇒230-1 |
| 120-2 | ACTIVE | PRIORITY | ○ NORMAL | ⇒230-2⇒230-3 |
| 120-3 | ACTIVE | — | × LOS | ⇒230-3 |
| 130-1 | STANDBY | | ○ NORMAL | |
| 130-2 | STANDBY | | ○ NORMAL | |
| 130-3 | STANDBY | | × UNEQ | |
| 220-1 | ACTIVE | TOP PRIORITY | ○ NORMAL | ⇒130-1 |
| 220-2 | ACTIVE | PRIORITY | × SD | ⇒130-2 |
| 220-3 | ACTIVE | — | ○ NORMAL | ⇒130-3⇒130-1 |
| 230-1 | STANDBY | | ○ NORMAL | |
| 230-2 | STANDBY | | × AIS | |
| 230-3 | STANDBY | | ○ NORMAL | |

FIG. 13

| PRIORITY | ALARM | CONTENTS |
|---|---|---|
| HIGH | LOS (Loss of Signal) | LOSS OF SIGNAL : OCCURRING WHEN OPTICAL SIGNAL INTENSITY IS BELOW SPECIFIED VALUE DURING SPECIFIED PERIOD |
| | AIS (Alarm Indication Signal) | ALARM INDICATION SIGNAL : SIGNAL SENT TO DOWNSTREAM SIDE TO DISPLAY ALARM STATE OF FAILURE DETECTED ON UPSTREAM SIDE |
| | SD (Signal Degraded) | SIGNAL DEGRADED : DISPLAYING STATE OF DEGRADED SIGNAL QUALITY SUCH AS ERROR RATE |
| | SF (Signal Failure) | SIGNAL FAILURE : DISPLAYING SIGNAL FAILURE STATE |
| | RDI (Remote Defect Indication) | REMOTE DEFECT INDICATION : DISPLAYING DEFECT STATE OF SIGNAL RECEIVED FROM OPPOSITE UNIT |
| LOW | UNEQ (UNEQuipment) | UNEQUIPMENT AND COMMUNICATION STANDBY STATE |

LARGE-CAPACITY FIBER OPTICAL SWITCHING DEVICE AND OPTICAL TRANSMISSION SYSTEM

CLAIM OF PRIORITY

The present application claims priority from Japanese patent application JP 2013-033428 filed on Feb. 22, 2013, the content of which is hereby incorporated by reference into this application.

BACKGROUND OF THE INVENTION

1. Field of the Invention

The invention relates to a large-capacity fiber optical switching device and an optical transmission system. For example, the invention relates to an optical switching device connected to multiple large-capacity optical fibers, each of which has multiple cores, and an optical transmission system using the optical switching device.

2. Description of the Related Arts

The approach for broadband through the optical fiber communication has brought about low-cost distribution of the large-capacity digital information. The new service using the approach further promotes the broadband communications, thus increasing the traffic volume of the internet at high rate twice as high as the one two years before. The optical fiber network has been developed, through which the large-capacity data are sent/received at high speeds for a relatively long distance of several kilometers, for example, backbone system, metro system, access system and the like. The optical interconnect technique for conversion of the signal wiring to fiber optics is thought to be effective for the short distance (several meters to several hundred meters) between the devices of the information communication Technology (ICT) system such as server of the data center, or the very short distance (several centimeters to several tens centimeters) in the device.

Meanwhile, research and development of communication capacity expansion of the optical fiber by means of such technique as wavelength division multiplex and multi-level modulation have been conducted with respect to the capacity increase. However, such study has reached the physical limit. The optical communication technique using the multicore fiber (hereinafter referred to as MCF) has been expected as the one for overcoming such limit. The generally employed single fiber only has one transmission channel through the single core. The multicore fiber has the transmission channel through multiple cores in the single fiber, which has drawn interest as the transmission medium that allows large-capacity high-density transmission. The research and development have been actively conducted in various organizations.

From the aforementioned circumstance, the study on the optical interconnect has been started for the purpose of realizing the large-capacity fiber such as the multicore fiber, and compact high density transmission. For example, Translation of PCT Application No. 2012-514768 discloses the optical interconnect technique configured to lay out the grating coupler in accordance with arrangement of the MCF cores using the photo diode (PD) via the waveguide or the optical device (optical chip) integrated for connection to the modulator. The optical interconnect in the device, and between the devices for realizing the compact high density transmission is thought to be indispensable for increase in the capacity of the data center. However, the use of the large-capacity high density wiring network may cause the risk of unexpectedly serious damage caused by the failure on the transmission path resulting from natural disasters and disconnection, thus needing the solution by which the high reliability is realized.

As the method for realizing the optical network with high reliability, an APS (Auto Protection Switch) method is known, which is employed for SONET (Synchronous Optical Network)/SDH (Synchronous Digital Hierarchy), and OTN (Optical Transport Network) in the long-distance trunk system network. The redundant system such as 1+1, 1:N may be thought through the allocation method of active/standby system.

The 1:N redundant system configuration will be described referring to FIG. 1. The optical signal used for the SONET/SDH and OTN has a frame structure for transmitting both main signals and supervisory control information. Generally employed switching devices 1 and 2 are connected through n pairs of optical fibers 1000-1 to 1000-$n$, and 1001-1 to 1001-$n$. The switching device 1 is composed of a supervisory control unit 50, active signal transmission optical transceivers 70-1 to 70-$n$, and a standby signal transmission optical transceiver 80. The switching device 2 is composed of a supervisory control unit 51, active signal transmission optical transceivers 71-1 to 71-$n$, and a standby signal transmission optical transceiver 81. If, for example, the optical fiber 1000-1 fails to transmit the optical signal owing to disconnection, failure information detected by the active signal transmission optical transceiver 71-1 of the switching device 2 is carried on a supervisory control signal part of the transmission frame so as to be received by the active signal transmission optical transceiver 70-1 of the switching device 1 via the optical fiber 1001-1. Upon reception of the failure information through the optical fiber 1000-1, the supervisory control unit 50 of the switching device 1 and the supervisory control unit 51 of the switching device 2 are linked for signal switching so that the signal transmitted by the active signal transmission optical transceivers 70-1 and 71-1 is transmitted by the standby signal optical transceivers 80 and 81.

JP-A-11-340922 discloses the wavelength division multiplex optical transmission system as another technology, representing the method of performing the wavelength division multiplex transmission of the supervisory control signal through the waveform other than the one for the main signal (see FIG. 2). It is possible to use the transceiver with smaller information volume at the lower bit rate for the supervisory control signal compared with the main signal, and provide flexibility from the aspect of S/N (Signal to Noise) ratio compared with the main signal transmission.

A maintenance/management (OAM: Operation Administration Maintenance) function of the SONET/SDH and OTN has been enhanced by the use of the supervisory control signal for the transmission frame. Recently, the OAM function is insufficient for the original Ethernet®, and accordingly, the ITU-T (International Telecommunication Union Telecommunication Standardization Sector) and IEEE (Institute of Electrical and Electronics Engineers) 802 Committee have promoted standardization for further enhancement.

Preferably, the multicore fiber is configured to have a uniform interval between geometrically adjacent cores for equally suppressing the optical crosstalk through transmission of the respective cores.

Arrangement of the cores will be described referring to FIGS. 3A to 3C. FIG. 3A is a sectional view of a generally employed single core fiber (hereinafter referred to as SCF) 1000. FIG. 3B is a sectional view of a 7-core MCF. FIG. 3C is a sectional view of a 19-core MCF. For the purpose of equalizing the interval between the cores of the 7-core MCF as shown in FIG. 3B, for example, respective cores 1510-1 to 1510-6 are arranged to form a regular hexagon having the core 1510-7 disposed at the center of the regular hexagon. As for the 19-core MCF as shown in FIG. 3C, the cores 1510-1 to 1510-12 are arranged at the respective apexes and medians of the regular hexagon. The cores 1510-13 to 1510-18 are arranged at the respective apexes of the regular hexagon with the common center, while having the core 1510-19 disposed at the center. The length of each side of the regular hexagon which is formed by the cores 1510-1 to 1510-12 is made twice as long as each section of the regular hexagon which is formed by the cores 1510-13 to 1510-18. This makes it possible to equalize the interval between the adjacent cores.

The MCF has a structurally difficulty in obtaining good optical coupling between the adjacent cores overall upon optical interconnection between the MCFs, which will be described referring to FIGS. 4A and 4B. FIGS. 4A and 4B are sectional views of the 7-core MCF which includes the peripherally arranged six cores (1510-1 to 1510-6) and the center core (1510-7). FIG. 4A represents an axial displacement which occurs in connection of the large-capacity optical fibers. It is assumed that the PC (Physical Contact) grinding used for the generally employed SCF is applied to the MCF optical interconnection. In this case, the possibility of displacement between the cores caused by the displacement in the rotary axis decreases at the center core. Meanwhile, the displacement in the rotary axis interferes with alignment of the cores, resulting in the loss between the outer peripheral cores. FIG. 4B illustrates the gap generated at the outer peripheral cores in connection to the large-capacity optical fibers. Likewise, the PC connection method is configured to grind the center of the fibers convexly and butting from both sides to realize appropriate optical interconnection. However, the MCF is likely to have the gap when the outer cores are brought into contact with each other (Please see the literature: Benjamin G. Lee, et al., "End-to-End Multicore Multimode Fiber Optic Link Operating up to 120 Gb/s", JOURNAL OF LIGHTWAVE TECHNOLOGY, Vol. 30, No. 6, p. 886, Mar. 15, 2012).

SUMMARY OF THE INVENTION

The center core of the MCF as described above is adjacent to the multiple outer cores as a structural feature. It is therefore likely to be influenced by the optical crosstalk compared with the other core.

Upon optical interconnection between the MCFs, it is difficult to obtain appropriate optical coupling between the cores overall. That is, the outer peripheral cores are hardly aligned because of the displacement in the rotary axis, resulting in the risk of loss. Unlike the SCF which requires the optical interconnection only at the center core, the MCF may cause the gap in the contact between the outer cores. This may cause the problem of difficulty in establishing the appropriate optical interconnection.

The invention provides the optical switching device using a highly reliable optical switching method, which is configured to ensure failure restoration by reducing the risk of the critical communication failure resulting from the fiber cutting in the large-capacity high density wiring network through MCF with general number of cores (7 cores, 19 cores and the like).

The invention provides the optical switching device as described below.

The optical switching device according to the invention includes a multicore fiber having multiple cores for transmitting at least one of an active signal and a standby signal, and a supervisory control signal, a failure detection unit for detecting occurrence of a transmission failure of the active signal based on a transmission condition of the active signal and information from the supervisory control signal, and a supervisory control unit for switching a transmission path of the active signal upon reception of the information on the detected transmission failure from the failure detection unit. The supervisory control signal is transmitted to the core surrounded by the cores to which at least one of the active signal and the standby signal is transmitted. Upon detection of the occurrence of the transmission failure of the active signal by the failure detection unit, the supervisory control unit switches the standby signal to the core different from the one to which the active signal is transmitted.

The invention further provides the optical switching device as described below.

The optical transmission system according to the invention includes a multicore fiber including multiple cores for transmitting at least one of an active signal and a standby signal, and a supervisory control signal, and a pair of optical switching devices coupled with respective ends of the multicore fiber. Each of the optical switching devices includes a failure detection unit for detecting occurrence of a transmission failure of the active signal based on a transmission condition of the active signal and information from the supervisory control signal, and a supervisory control unit for switching a transmission path of the active signal upon reception of the information with respect to the occurrence of the transmission failure from the failure detection unit. The supervisory control signal is transmitted to the cores disposed in a region that includes a center axis of the multicore fiber. Upon detection of the occurrence of the transmission failure of the active signal by the failure detection unit, the supervisory control unit switches the standby signal to the core different from the one to which the active signal is transmitted.

The invention provides the optical switching device using highly reliable optical switching method, which is configured to ensure failure restoration by reducing the risk of the critical communication failure resulting from fiber cutting in the large-capacity high density wiring network through MCF with general number of cores (7 cores, 19 cores and the like).

BRIEF DESCRIPTION OF THE DRAWINGS

FIG. 12 is an example of contents stored in a switching table of the optical switching device according to the first embodiment of the invention; and FIG. 13 is a table representing an example of supervisory information sent to a supervisory control signal.

DETAILED DESCRIPTION OF THE PREFERRED EMBODIMENTS

Figure 1:
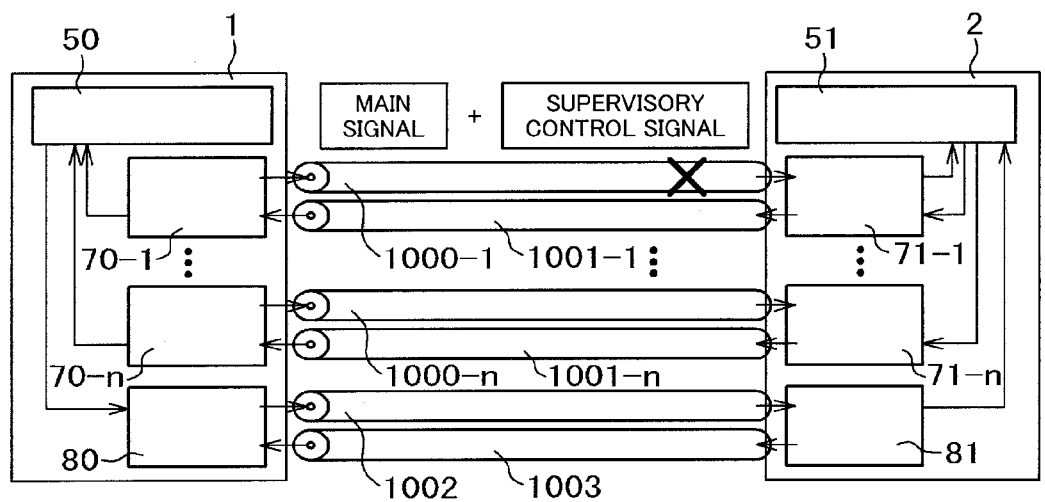
FIG. 1 is a view illustrating a structure of a generally employed switching device.
Figure 2:
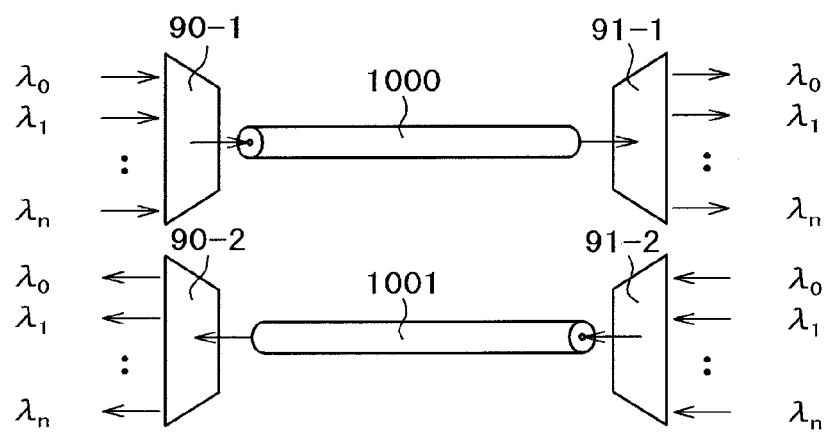
FIG. 2 is a view illustrating a structure of a generally employed transmission device.
Figure 3A:
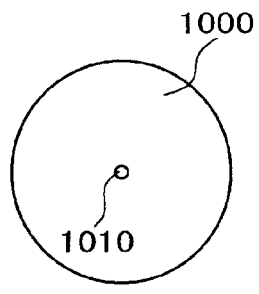
FIG. 3A is a sectional view of a generally employed optical fiber.
Figure 3B:
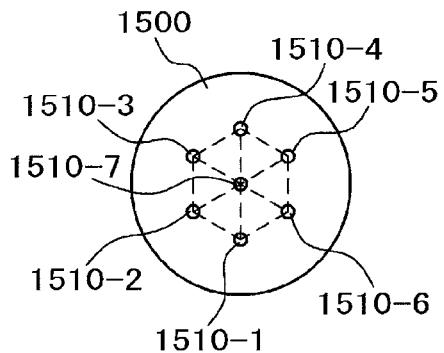
FIG. 3B is a sectional view of a large-capacity optical fiber with 7 cores.
Figure 3C:
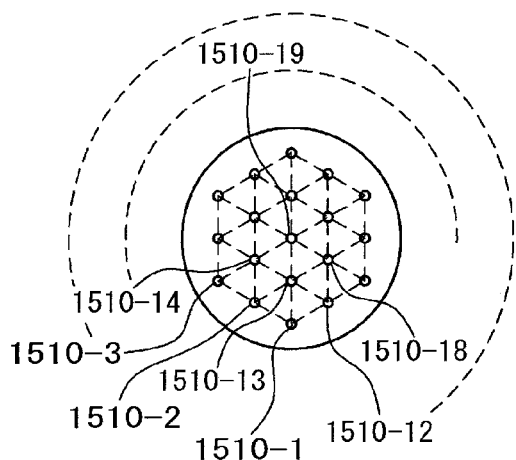
FIG. 3C is a sectional view of a large-capacity optical fiber with 19 cores.
Figure 4A:
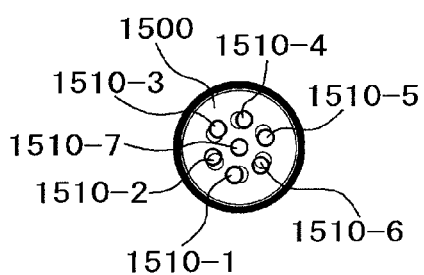
FIG. 4A is a view illustrating an axial displacement in connection of the large-capacity optical fibers.
Figure 4B:
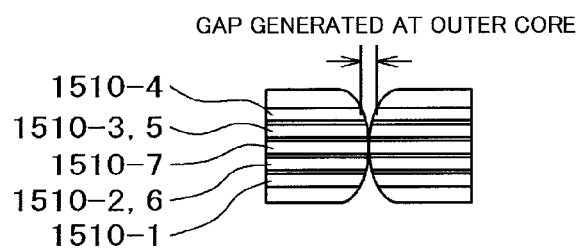
FIG. 4B is a view illustrating a gap generated at the outer core in connection of the large-capacity optical fibers.

Embodiments will be described referring to the drawings.

First Embodiment

An example of an optical switching device connected to the large-capacity fiber will be described in this embodiment.

Figure 5:
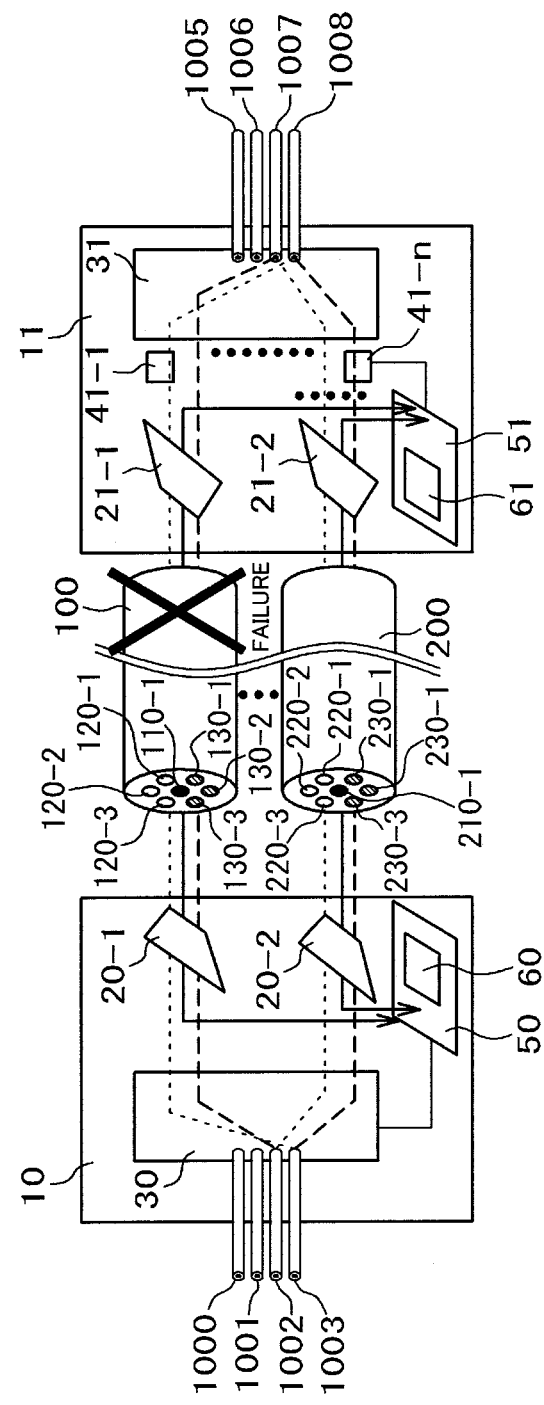
FIG. 5 is a view illustrating a structure of an optical switching device according to a first embodiment of the invention.

FIG. 5 illustrates an example of the optical switching device according to a first embodiment of the invention, which includes optical switching devices 10 and 11, and large-capacity optical fibers 100 and 200. The optical switching device 10 according to the invention includes large-capacity fiber optical coupling parts 20-1, 20-2, a path dispersion optical switch 30, a supervisory control unit 50, and a switching table 60. The optical switching device 11 according the invention includes large-capacity fiber optical coupling parts 21-1, 21-2, a path dispersion optical switch 31, failure detection units 41-1 to 41-n, a supervisory control unit 51 and a switching table 61.

It is assumed that the optical switching device for the large-capacity optical fiber includes n elements. The drawing represents the case where two elements are provided for convenience of explanation. It is also assumed that n failure detection units including 41-1 to 41-n are provided. The drawing represents the case where only two failure detection units are provided.

The respective large-capacity optical fibers 100 and 200 are connected to the large-capacity fiber optical coupling parts 20-1 and 20-2 of the optical switching device 10, and the large-capacity fiber optical coupling parts 21-1 and 21-2 of the optical switching device 11, respectively. The large-capacity optical fibers 100 and 200 include multiple cores, to which active signals, standby signals and supervisory control signals are transmitted, respectively.

The supervisory control signal is transmitted through supervisory control signal transmission cores 110-1 and 210-1, the active signal is transmitted through active signal transmission cores 120-1 to 120-3 and 220-1 to 220-3, and the standby signal is transmitted through standby signal transmission cores 130-1 to 130-3 and 230-1 to 230-3, respectively.

Referring to FIG. 5, the transmission path of the supervisory control signal is represented by a solid line, and the transmission path of the active signal is represented by a thin dotted line. The transmission path of the standby signal is represented by a thick broken line.

Optical fibers 1000 to 1003 are connected to the path dispersion optical switch 30 of the optical switching device 10. Optical fibers 1005 to 1008 are connected to the path dispersion optical switch 31 of the optical switching device 11.

The large-capacity optical signal (active signal and standby signal) is input to the optical fibers 1000 to 1003 so that the path is selected by the path dispersion optical switch 30 of the optical switching device 10, and then the signal is transmitted to any one of the large-capacity fiber optical coupling parts 20-1 and 20-2, through which the signal is transmitted via the large-capacity optical fibers 100 and 200. Then the path is selected by the path dispersion optical switch 31 via the large-capacity fiber optical coupling parts 21-1 and 21-2 of the optical switching device 11. The signal is then output from the optical fibers 1005 to 1008.

The respective optical signals output from the large-capacity fiber optical coupling parts 20-1 and 20-2 are detected by the failure detection units 41-1 to 41-n for any failure. Specifically, the failure detection units 41-1 to 41-n are configured to partially branch the optical signal to monitor optical power, and judges that "failure occurs" if the monitored power does not reach the predetermined power level. Alternatively, the detection unit may be simply configured to judge the "failure" as a result of simply monitoring the specific pattern.

Upon reception of the input of the failure information from the failure detection units 41-1 to 41-n, the supervisory control unit 51 is able to inform the supervisory control unit 50 of the core through which the transmitted signal has failed using the supervisory control signal. The supervisory control units 50 and 51 have switching tables 60 and 61, respectively, which preliminarily store the information about the fiber and the core to be switched upon reception of the failure information.

The information of the switching tables 60 and 61 is preliminarily synchronized to have the same contents. This allows the supervisory control units 50 and 51 to perform switching operations to the fiber and the core allocated as the standby path through the path dispersion optical switches 30 and 31 in accordance with the failure state. The supervisory control signal is sent and received between the supervisory control units 50 and 51 via the large-capacity fiber optical coupling parts 20-1, 20-2, the large-capacity optical fibers 100, 200, and the large-capacity fiber optical coupling parts 21-1, 21-2. The respective cores of the large-capacity optical fiber 100 are allocated as a supervisory control signal transmission core 110-1, active signal transmission cores 120-1 to 120-3, and the standby signal transmission cores 130-1 to 130-3. The respective cores of the large-capacity optical fiber 200 are allocated as a supervisory control signal transmission core 210-1, active signal transmission cores 220-1 to 220-3, and standby signal transmission cores 230-1 to 230-3.

A specific switching operation will be described referring to an example of contents stored in the switching tables 60 and 61 referring to FIG. 12.

FIG. 12 shows a table which lists information whether the transmitted signal is active or standby corresponding to paths (transmission core) for the respective cores (120-1 to 120-3, 130-1 to 130-3) of the large-capacity optical fiber 100, and the respective cores (220-1 to 220-3, 230-1 to 230-3) of the large-capacity optical fiber 200, the path priority, condition of the transmission path, and actions taken against the detected failure. The condition of the transmission path listed in the table of FIG. 12 indicates normal or failure state. The details of the detected failure (for example, LOS) will be specified in a table shown in FIG. 13.

As FIG. 12 represents, the switching tables 60 and 61 preliminarily store data with respect to the path (the transmission core to be allocated), action/standby, condition, and the action taken against the failure. For example, in the case where the path allocated as the action signal of the large-capacity optical fiber 100 is transmitted through the active signal transmission core 120-1, the current condition is determined as "normal". If the failure occurs, the path allocated as the standby signal is preliminarily determined to be transmitted through the standby signal transmission core 230-1. In this case, the switching tables 60 and 61 of the optical switching devices 10 and 11 which face with each other include the same contents. Upon detection of the failure performed by the failure detection units 41-1 to 41-*n*, the supervisory control units 50 and 51 immediately switch the path dispersion optical switches 30 and 31 after determination with respect to the path to be switched.

As another example, in the case where the path allocated as the active signal of the large-capacity optical fiber 100 is transmitted through the active signal transmission core 120-2, the current condition is "normal". If the failure occurs, the path allocated as the standby signal is preliminarily determined to be transmitted through the standby signal transmission core 230-2.

If it is known that the alarm indication system (AIS) indicates the transmission failure in the standby signal transmission core 230-2 beforehand, it is possible to preliminarily allocate the core 230-3 as the secondary standby transmission core. At this time, it is possible to preliminarily set the path priority to give the "top priority" to the active signal transmission core 120-1, and give the "priority" to the 120-2 over 120-3. In the aforementioned case, if the failure occurs in the active signal transmission core 120-2 earlier, the standby signal transmission core 230-3 is preferentially allocated. If the failure occurs in the core 120-3, the process may be executed in accordance with the path priority so as not to bypass the core 120-2.

FIG. 13 is a table listing alarms and descriptions thereof. The priority is determined in accordance with the alarm. The table shows the priority which becomes higher upward, and becomes lower downward.

If the path priority shown in FIG. 12 is the same, the process is designed to perform the switching operation so that the one corresponding to the alarm with higher priority shown in FIG. 13 is prioritized. In other words, the switching operation may be performed to relieve the failure with more severity.

Figure 6:
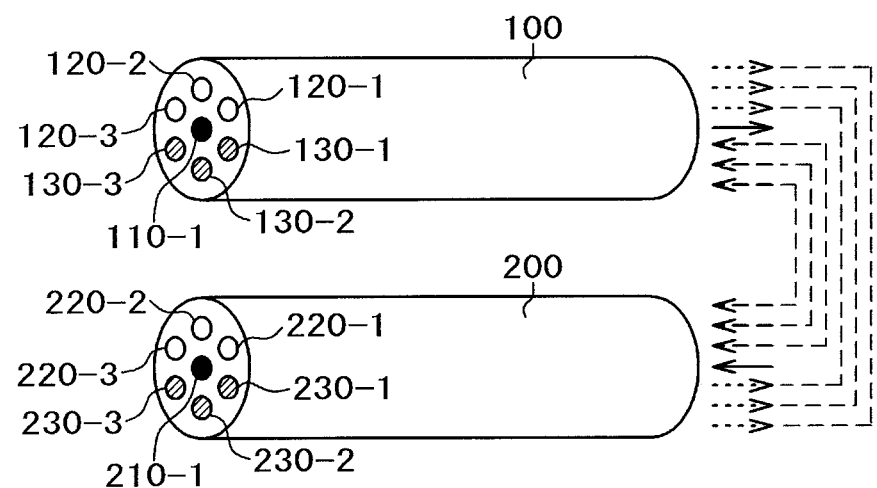
FIG. 6 is a view representing a signal allocation to cores of the large-capacity fibers connected to the optical switching device according to the first embodiment of the invention.

FIG. 6 illustrates an exemplary allocation to the supervisory control signal transmission cores, the active signal transmission cores and the standby signal transmission cores of the two large-capacity optical fibers 100 and 200 so as to be applied to the active/standby system of 1+1, and 1:1 in the unidirectional transmission between cores. In the redundant configuration of 1+1, the same signal as in the active system is transmitted to the standby system in the normal state. If the failure occurs, the transmission path is selected by the optical switching device at the receiver side to realize the redundant system. The redundant configuration of 1:1 is designed not to send the signal to the standby system in the normal state, or to allocate the signal with low priority so that the standby system to be selected upon the failure such as the extra traffic is not available. Then the optical switching devices at the sender and the receiver sides select the transmission path upon the failure to realize the redundant system. The supervisory control signal is transmitted through the supervisory control signal transmission cores 110-1 and 210-1 positioned at the respective centers of the large-capacity optical fibers 100 and 200. The active signal is transmitted through the active signal transmission cores 120-1 to 120-3 and 220-1 to 220-3. The standby signal is transmitted through the standby signal transmission cores 130-1 to 130-3 and 230-1 to 230-3.

The supervisory control signal is transmitted in the opposite direction to the one in which the active signal or the standby signal is transmitted. For the purpose of coping with the failure such as the fiber cutting, the standby signal transmission cores 230-1 to 230-3 are allocated as the standby system for the active signal transmission cores 120-1 to 120-3. The standby signal transmission cores 130-1 to 130-3 are allocated as the standby system for the active signal transmission cores 220-1 to 220-3.

Referring to FIG. 6, the center core of the MCF is allocated as the supervisory control signal transmission core. However, it is possible to increase the number of the supervisory control signal transmission cores by reducing the number of the active signal transmission cores or the standby signal transmission cores.

Second Embodiment

Figure 7:
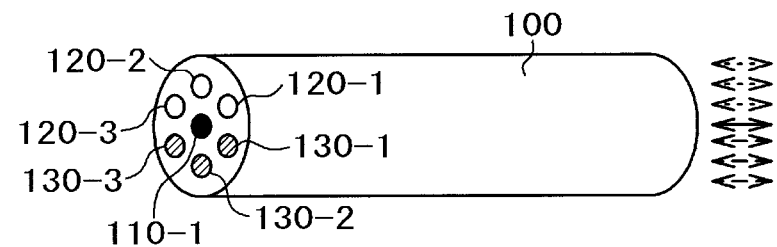
FIG. 7 is a view representing a signal allocation to the cores of the large-capacity fiber connected to an optical switching device according to a second embodiment of the invention.

This embodiment is configured to allocate the supervisory control signal transmission core, the active signal transmission core and the standby signal transmission core of the large-capacity optical fiber 100 for application to the active/standby system of 1+1, 1:1 in a bidirectional transmission between cores through the single large-capacity optical fiber. A second embodiment will be described in detail referring to FIG. 7. The supervisory control signal is transmitted through the supervisory control signal transmission core 110-1 positioned at the center of the large-capacity optical fiber 100. The active signal is transmitted through the active signal transmission cores 120-1 to 120-3. The standby signal is transmitted through the standby signal transmission cores 130-1 to 130-3. The bidirectional transmission is realized by the method for transmitting signals with different waveforms through the wavelength division multiplex process, or the method for isolating the light with the same wavelength by an optical circulator.

Third Embodiment

This embodiment represents an exemplary allocation of the supervisory control signal transmission cores, the active signal transmission cores and the standby signal transmission cores of the large-capacity optical fibers 100, 101, 200 and 201 for application to the active/standby system of 1+1, 1:1 in the unidirectional transmission between the cores through those four large-capacity optical fibers.

Figure 8:
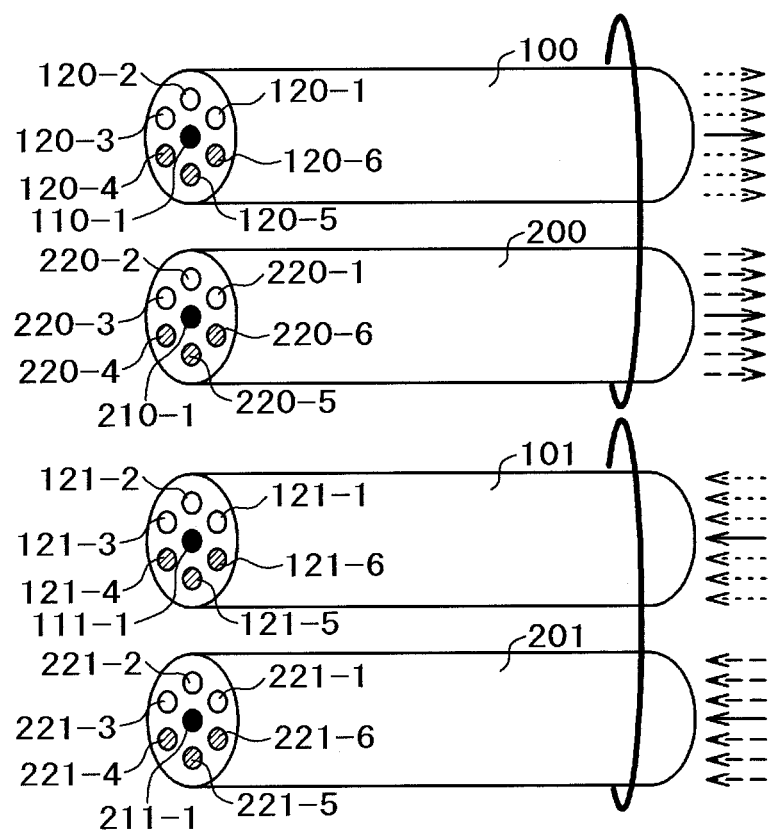
FIG. 8 is a view representing a signal allocation to the cores of the large-capacity fibers connected to an optical switching device according to a third embodiment of the invention.

A third embodiment will be described in detail referring to FIG. 8. The supervisory control signals are transmitted through the supervisory control signal transmission cores 110-1, 111-1, 210-1 and 211-1 positioned at the respective centers of the large-capacity optical fibers 100 (active, from the optical switching device 10 to 11), 101 (active, from the optical switching device 11 to 10), 200 (standby, from the optical switching device 10 to 11), and 201 (standby, from the optical switching device 11 to 10). The active signals are transmitted through the active signal transmission cores 120-1 to 120-6, and 121-1 to 121-6. The standby signals are transmitted through the standby signal transmission cores 220-1 to 220-6 and 221-1 to 221-6.

Fourth Embodiment

This embodiment represents an exemplary allocation to the supervisory control signal transmission cores, the active signal transmission cores and the standby signal transmission cores of the large-capacity optical fibers 100, 101, 102, 103, 200 and 201 for application to the active/standby system of 1:N in the unidirectional transmission between the cores through the 1+N (in this example, N=2) large-capacity optical fibers.

Figure 9:
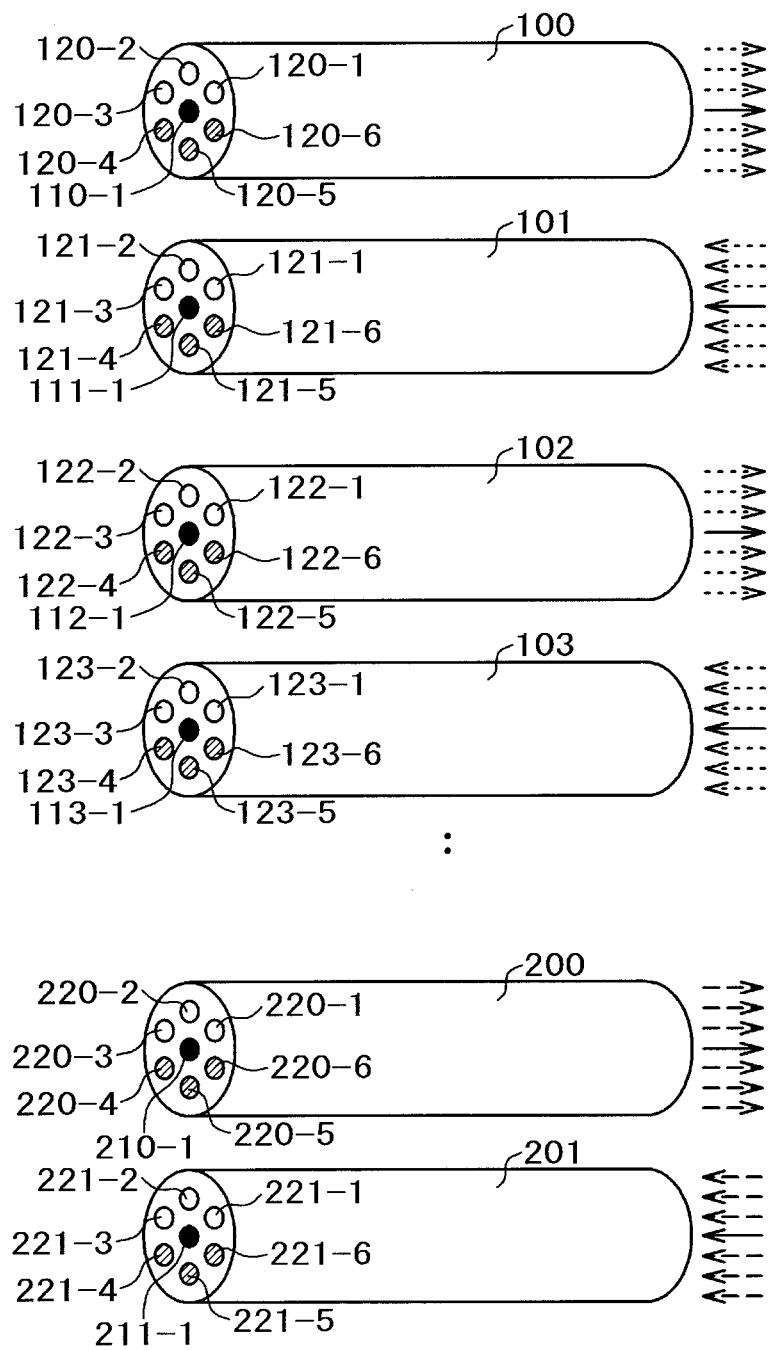
FIG. 9 is a view representing a signal allocation to the cores of the large-capacity fibers connected to an optical switching device according to a fourth embodiment of the invention.

A fourth embodiment will be described in detail referring to FIG. 9. The supervisory control signals are transmitted through the supervisory control signal transmission cores 110-1, 111-1, 112-1, 113-1, 210-1 and 211-1 positioned at the respective centers of the large-capacity optical fibers 100 and 102 (active, from the optical switching device 10 to 11), 101 and 103 (active, from the optical switching device 11 to 10), 200 (standby, from the optical switching device 10 to 11), and 201 (standby, from the optical switching device 11 to 10). The active signals are transmitted through the active signal transmission cores 120-1 to 120-6, 121-1 to 121-6, 122-1 to 122-6, and 123-1 to 123-6. The standby signals are transmitted through the standby signal transmission cores 220-1 to 220-6 and 221-1 to 221-6.

Figure 10:
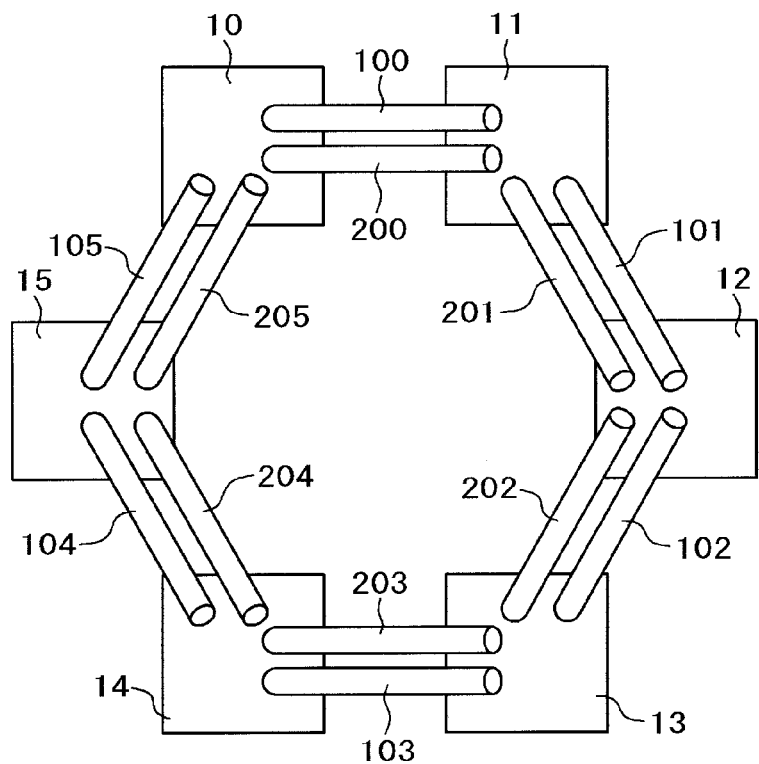
FIG. 10 is a view illustrating an example for applying the invention to a redundant system of a ring-like network.

The drawing only shows the linear network configuration. The concept of the invention for allocation of the center core of the MCF for the supervisory control signal transmission may be applied to the redundant system of the ring-like network shown in FIG. 10, or the mesh network shown in FIG. 11. Referring to FIG. 10, six optical switching devices are connected to form the ring shape. The optical switching devices are connected through the large-capacity optical fibers 100 to 105 for the active signal transmission, and the large-capacity optical fibers 200 to 205 for the standby signal transmission.

Figure 11:
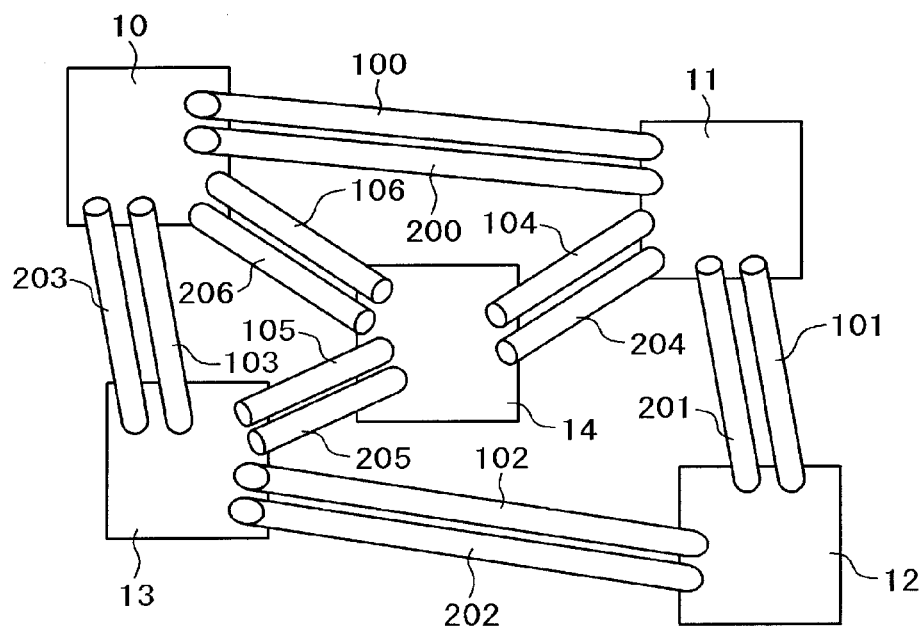
FIG. 11 is a view illustrating an example for applying the invention to a redundant system of a mesh network.

For example, the protocol of the ring network includes UPSR (Unidirectional Path Switched Ring), BLSR (Bidirectional Line Switched Ring) and the like, which allows application of the concept of the invention. FIG. 11 illustrates a structure having five optical switching devices connected in a mesh. The respective optical switching devices are connected through the large-capacity optical fibers 100 to 106 for the active signal transmission, and the large-capacity optical fibers 200 to 206 for the standby signal transmission. Compared with the linear network, the ring network and the mesh network are allowed to increase the number of bypass channels upon the failure. This ensures a highly reliable network construction.

The use of the switching device of the system 1:N may have a possibility to reduce the switching period by synchronizing the switching timing between the opposite devices. The SONET/SDH and OTN are standardized to have the bit rate four times higher, and the Ethernet is standardized to have the bit rate four or ten times higher. In consideration of the aforementioned standardization, the allocation of the active cores may be a multiple of 4 or 10 so as to provide the transmission method with improved storage efficiency.

Furthermore, the effect for reducing the influence of the crosstalk to the main signal may be expected by decreasing the optical power of the supervisory control signal to be lower than that of the main signal light (active or standby signal light).

The present invention is configured to ensure transmission of the supervisory control information to the opposite optical switching device for connection to the multicore fibers. This makes it possible to realize the highly reliable large-capacity optical wiring network while reducing the risk of causing the critical communication failure in the large-capacity transmission through the MCF.

What is claimed is:

1. An optical switching device comprising:
   a multicore fiber having a plurality of cores for transmitting at least one of an active signal and a standby signal, and a supervisory control signal;
   a failure detection unit for detecting occurrence of a transmission failure of the active signal based on a transmission condition of the active signal and information from the supervisory control signal; and
   a supervisory control unit for switching a transmission path of the active signal upon reception of the information on the detected transmission failure from the failure detection unit, wherein:
   the supervisory control signal is transmitted to the core surrounded by the cores to which at least one of the active signal and the standby signal is transmitted; and
   upon detection of the occurrence of the transmission failure of the active signal by the failure detection unit, the supervisory control unit switches the standby signal to the core different from the one to which the active signal is transmitted.

2. The optical switching device according to claim 1, further comprising the plurality of multicore fibers, wherein:
   each of the multicore fibers has cores for transmitting at least one of the active signal and the standby signal, and the supervisory control signal; and
   upon detection of the transmission failure of the active signal transmitted to one of the multicore fibers by the failure detection unit, the supervisory control unit switches the active signal to the standby signal transmitted to another one of the multicore fibers.

3. An optical switching device comprising;
   a multicore fiber having a plurality of cores for transmitting at least one of an active signal and a standby signal, and a supervisory control signal;
   a first optical switching unit coupled with one end of the multicore fiber; and
   a second optical switching unit coupled with the other end of the multicore fiber, wherein:
   the first optical switching unit includes a first path dispersion optical switch for dispersing paths of the active signal and the standby signal input from an optical transmission path coupled with the first optical switching unit to output the signal dispersed to the one end of the multicore fiber, and a first switching table that stores information referenced for determining the multicore fiber and the core to which the active signal and the standby signal are transmitted;
   the second optical switching unit includes a second path dispersion optical switch for determining the optical transmission paths which output the active signal and the standby signal from the other end of the multicore fiber to the outside, a second switching table that stores information referenced for determining any one of the optical transmission paths to which the active signal and the standby signal are transmitted, and a failure detection unit for detecting occurrence of a transmission failure of the active signal based on a transmission condition of the active signal and information from the supervisory control signal;
   the supervisory control signal is transmitted to the core disposed in a region that contains a center axis of the multicore fiber; and
   upon detection of the occurrence of the transmission failure of the active signal by the failure detection unit, the supervisory control unit switches the standby signal to the core different from the one to which the active signal is transmitted.

4. The optical switching device according to claim 1, wherein:
   The cores include a first core for transmitting the active signal, a second core for transmitting the standby signal, and a third core for transmitting the supervisory control signal; and the first core and the second core are disposed in a peripheral area of a cross-section of the multicore fiber, and the third core is disposed at a center area of the cross-section of the multicore fiber.

5. The optical switching device according to claim 4, wherein the third core reduces an influence of a crosstalk to the active signal and the standby signal by transmitting a signal with power lower than that of the active and the standby signals.

6. The optical switching device according to claim 1, wherein the supervisory control signal is transmitted in a direction opposite to a transmission direction of the active signal or the standby signal.

7. The optical switching device according to claim 1, wherein the supervisory control signal is transmitted to any one of the plurality of cores.

8. The optical switching device according to claim 1, further comprising the single multicore fiber, wherein:
the multicore fiber includes the cores for transmitting the active signal, the standby signal and the supervisory control signal, and
the active signal, the standby signal and the supervisory control signal are bidirectionally transmitted in a single core.

9. The optical switching device according to claim 4, wherein the supervisory control signal is bidirectionally transmitted through wavelength division multiplex.

10. The optical switching device according to claim 1, wherein the number of cores of the multicore fiber, which are allocated to the active signal is set to a multiple of 4 or 10.

11. An optical transmission system comprising:
a multicore fiber including a plurality of cores for transmitting at least one of an active signal and a standby signal, and a supervisory control signal; and
a pair of optical switching devices coupled with respective ends of the multicore fiber, wherein:
each of the optical switching devices includes a failure detection unit for detecting occurrence of a transmission failure of the active signal based on a transmission condition of the active signal and information from the supervisory control signal, and a supervisory control unit for switching a transmission path of the active signal upon reception of the information with respect to the occurrence of the transmission failure from the failure detection unit;
the supervisory control signal is transmitted to the cores disposed in a region that includes a center axis of the multicore fiber; and
upon detection of the occurrence of the transmission failure of the active signal by the failure detection unit, the supervisory control unit switches the standby signal to the core different from the one to which the active signal is transmitted.

12. The optical transmission system according to claim 11, wherein the pair of optical switching devices synchronize a timing for switching a light to be transmitted.

13. The optical transmission system according to claim 11, wherein:
the supervisory control unit includes a switching table;
the switching table stores information with respect to an allocation rate of the active signal and the standby signal N:M (N,M: natural number), and the core of the multicore fiber to which the transmission path is switched in accordance with a condition of the transmission failure; and
the pair of optical switching devices share the information of the switching table.

14. The optical transmission system according to claim 11, wherein the optical transmission system has a ring network.

15. The optical transmission system according to claim 11, wherein the optical transmission system has a mesh network.

* * * * *